(12) United States Patent
Meylan et al.

(10) Patent No.: US 9,185,715 B2
(45) Date of Patent: Nov. 10, 2015

(54) INTER-SYSTEM CALL SWITCHING BETWEEN CO-EXISTENCE WIRELESS SYSTEMS

(71) Applicant: QUALCOMM Incorporated, San Diego, CA (US)

(72) Inventors: Arnaud Meylan, San Diego, CA (US); Yan Zhou, San Diego, CA (US); Peerapol Tinnakornsrisuphap, San Diego, CA (US); Chirag Patel, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/786,657

(22) Filed: Mar. 6, 2013

(65) Prior Publication Data
US 2014/0113590 A1    Apr. 24, 2014

Related U.S. Application Data

(60) Provisional application No. 61/716,999, filed on Oct. 22, 2012.

(51) Int. Cl.
*H04W 4/00* (2009.01)
*H04W 36/00* (2009.01)
(Continued)

(52) U.S. Cl.
CPC ............. *H04W 72/10* (2013.01); *H04L 45/028* (2013.01); *H04W 36/00* (2013.01);
(Continued)

(58) Field of Classification Search
CPC ............... H04L 45/028; H04W 36/00; H04W 36/0022; H04W 36/0066; H04W 36/14

USPC .................. 455/411, 452.1, 435.1, 436, 437; 370/328, 329, 310.2, 338, 331–332
See application file for complete search history.

(56) References Cited

U.S. PATENT DOCUMENTS 7,457,621 B2   11/2008   Zhang
7,949,812 B1   5/2011    Wong et al.
(Continued)

FOREIGN PATENT DOCUMENTS

EP    1227695 A1    7/2002
EP    1983789 A1    10/2008
(Continued)

OTHER PUBLICATIONS

International Search Report and Written Opinion—PCT/US2013/065753—ISA/EPO—Apr. 23, 2014.
(Continued)

*Primary Examiner* — San Htun (57) ABSTRACT

Techniques for switching a user equipment (UE) between wireless systems by first establishing a connection with a target system before disconnecting from a serving system are disclosed. In one design, the UE may initially communicate with a first wireless system (e.g., a WLAN system) of a first radio technology. The UE may receive a page to establish a connection with a second wireless system (e.g., a cellular system) of a second radio technology. The first and second wireless systems may be part of a small cell. The page may be sent by the second wireless system to the UE in response to a decision by a network entity to switch the UE from the first wireless system to the second wireless system. The UE may establish a connection with the second wireless system in response to the page and may thereafter terminate communication with the first wireless system.

33 Claims, 6 Drawing Sheets

(51) Int. Cl.
*H04W 72/00* (2009.01)
*H04M 1/66* (2006.01)
*H04W 72/10* (2009.01)
*H04L 12/759* (2013.01)
*H04W 36/14* (2009.01)
*H04W 48/18* (2009.01)
*H04W 36/24* (2009.01)
*H04W 36/22* (2009.01)
*H04W 48/06* (2009.01)

(52) U.S. Cl.
CPC ......... *H04W 36/0022* (2013.01); *H04W 36/14* (2013.01); *H04W 36/22* (2013.01); *H04W 36/24* (2013.01); *H04W 48/06* (2013.01); *H04W 48/18* (2013.01); *H04W 36/0066* (2013.01)

(56) References Cited

U.S. PATENT DOCUMENTS

| | | | |
|---|---|---|---|
| 8,200,232 B2 | 6/2012 | Lee et al. | |
| 8,249,505 B1 | 8/2012 | Goldner et al. | |
| 8,504,055 B2 | 8/2013 | Vikberg et al. | |
| 2001/0012778 A1 | 8/2001 | Eriksson et al. | |
| 2004/0180660 A1 | 9/2004 | Choi et al. | |
| 2005/0066033 A1 | 3/2005 | Cheston et al. | |
| 2005/0070287 A1 | 3/2005 | Cave et al. | |
| 2005/0094560 A1 | 5/2005 | Montes | |
| 2006/0121901 A1* | 6/2006 | Tanaka et al. | 455/436 |
| 2007/0280161 A1 | 12/2007 | Rudrapatna et al. | |
| 2008/0014957 A1* | 1/2008 | Ore | 455/452.1 |
| 2008/0170497 A1 | 7/2008 | Jeong et al. | |
| 2008/0254797 A1 | 10/2008 | Achtari et al. | |
| 2009/0046665 A1 | 2/2009 | Robson et al. | |
| 2009/0088131 A1 | 4/2009 | Gholmieh et al. | |
| 2009/0175454 A1 | 7/2009 | Watanabe et al. | |
| 2009/0203375 A1 | 8/2009 | Gisby et al. | |
| 2009/0232088 A1 | 9/2009 | Wisely | |
| 2009/0318144 A1 | 12/2009 | Thomas et al. | |
| 2010/0128696 A1 | 5/2010 | Fantini et al. | |
| 2010/0220687 A1* | 9/2010 | Reznik et al. | 370/331 |
| 2010/0227591 A1* | 9/2010 | Park et al. | 455/411 |
| 2010/0240386 A1 | 9/2010 | Hamabe et al. | |
| 2010/0281519 A1 | 11/2010 | Das et al. | |
| 2011/0013559 A1 | 1/2011 | Marin | |
| 2011/0039562 A1* | 2/2011 | Balasubramanian et al. | 455/436 |
| 2011/0093913 A1 | 4/2011 | Wohlert et al. | |
| 2011/0110520 A1 | 5/2011 | Ness et al. | |
| 2011/0176511 A1* | 7/2011 | Sayeedi | 370/331 |
| 2011/0195714 A1 | 8/2011 | Sawinathan | |
| 2011/0244866 A1 | 10/2011 | Yamamoto et al. | |
| 2011/0263250 A1 | 10/2011 | Mueck et al. | |
| 2011/0312365 A1 | 12/2011 | Hatano et al. | |
| 2011/0320588 A1 | 12/2011 | Raleigh | |
| 2012/0014345 A1 | 1/2012 | Faurie et al. | |
| 2012/0026865 A1 | 2/2012 | Fan et al. | |
| 2012/0033658 A1 | 2/2012 | Ganesan | |
| 2012/0044804 A1 | 2/2012 | Rahman et al. | |
| 2012/0044897 A1 | 2/2012 | Wager et al. | |
| 2012/0100861 A1* | 4/2012 | Zhang et al. | 455/444 |
| 2012/0122458 A1 | 5/2012 | Jokinen et al. | |
| 2012/0149351 A1 | 6/2012 | Kalbag | |
| 2012/0178467 A1 | 7/2012 | Fujii et al. | |
| 2012/0196644 A1 | 8/2012 | Scherzer et al. | |
| 2013/0003590 A1 | 1/2013 | Gage et al. | |
| 2013/0016700 A1* | 1/2013 | Yu et al. | 370/331 |
| 2014/0004862 A1 | 1/2014 | Ekemark | |
| 2014/0044003 A1 | 2/2014 | Drazynski et al. | |
| 2014/0071967 A1 | 3/2014 | Velasco | |
| 2014/0073317 A1 | 3/2014 | Zhou et al. | |
| 2014/0112169 A1 | 4/2014 | Zhou | |
| 2014/0112170 A1 | 4/2014 | Zhou | |
| 2014/0112306 A1 | 4/2014 | Zhou | |
| 2014/0113631 A1 | 4/2014 | Zhou | |

FOREIGN PATENT DOCUMENTS

| | | |
|---|---|---|
| EP | 2312902 A1 | 4/2011 |
| EP | 2437546 A1 | 4/2012 |
| EP | 2571311 A1 | 3/2013 |
| WO | WO-2005101889 A1 | 10/2005 |
| WO | WO-2006075937 A1 | 7/2006 |
| WO | WO-2009000696 A1 | 12/2008 |
| WO | WO 2009152738 A1 * | 12/2009 |
| WO | WO-2010068155 A1 | 6/2010 |
| WO | 2010080056 A1 | 7/2010 |
| WO | WO-2011054089 A1 | 5/2011 |
| WO | 2011107886 A1 | 9/2011 |
| WO | 2012121757 A1 | 9/2012 |

OTHER PUBLICATIONS

Shrestha G., et al., "A Method to Estimate the Reliability of Expert Judgement", Session 10C2, IEEE Proceedings—1989 Southeastcon, pp. 152-157.

Taiwan Search Report—TW102137935—TIPO—Mar. 19, 2015.

* cited by examiner

FIG. 8

INTER-SYSTEM CALL SWITCHING BETWEEN CO-EXISTENCE WIRELESS SYSTEMS

The present application claims priority to provisional U.S. Application Ser. No. 61/716,999, entitled "METHOD AND APPARATUS FOR SUPPORTING WIRELESS COMMUNICATION VIA A SMALL CELL," filed Oct. 22, 2012, and incorporated herein by reference in its entirety.

BACKGROUND

I. Field

The present disclosure relates generally to communication, and more specifically to techniques for supporting wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include one or more base stations that can support communication for one or more user equipments (UEs). A UE may communicate with a base station via the downlink and uplink. The downlink (or forward link) refers to the communication link from the base station to the UE, and the uplink (or reverse link) refers to the communication link from the UE to the base station.

Multiple wireless systems utilizing different radio technologies may be deployed in a given geographic area. Any number of UEs may be located within the geographic area. Each UE may support one or more of the radio technologies utilized by the multiple wireless systems. It may be desirable to efficiently support communication for the UEs via the multiple wireless systems.

SUMMARY

Techniques for switching a UE between wireless systems are disclosed herein. These techniques may be used for switching UEs between wireless systems in a small cell and/or wireless systems deployed in other manners. A small cell may include an access point for a wireless local area network (WLAN) system and a femto cell (or a radio access node) for a cellular system. The small cell may perform certain control functions such as (i) switching of UEs between wireless systems of the small cell and (ii) possibly switching of UEs between the wireless systems of the small cell and wireless systems external to the small cell.

In an aspect of the present disclosure, a UE may be switched between a current serving system and a new target system by first establishing a connection with the target system before disconnecting from the serving system. The target system and the serving system may support different radio technologies, and connection establishment and disconnection may typically be performed independently for each wireless system. In the present disclosure, a network entity (e.g., a small cell) may coordinate the wireless systems in order to ensure that a new call for the UE is first established on the target system before breaking an existing call for the UE on the serving system.

In one design, a UE may initially communicate with a first wireless system (e.g., a WLAN system) of a first radio technology. The UE may receive a page to establish a connection with a second wireless system (e.g., a cellular system) of a second radio technology. The first and second wireless systems may be part of a small cell, which may perform at least one control function for the first and second wireless systems. The page may be sent by the second wireless system to the UE in response to a decision by the small cell to switch the UE from the first wireless system to the second wireless system. The UE may establish a connection with the second wireless system in response to the page and may continue to communicate with the first wireless system while establishing the connection with the second wireless system. The UE may terminate communication with the first wireless system after establishing the connection with the second wireless system.

Various aspects and features of the disclosure are described in further detail below.

DETAILED DESCRIPTION

The techniques described herein may be used for various wireless communication systems such as CDMA, TDMA, FDMA, OFDMA, SC-FDMA and other wireless systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless systems and radio technologies mentioned above as well as other wireless systems and radio technologies.

Figure 1:
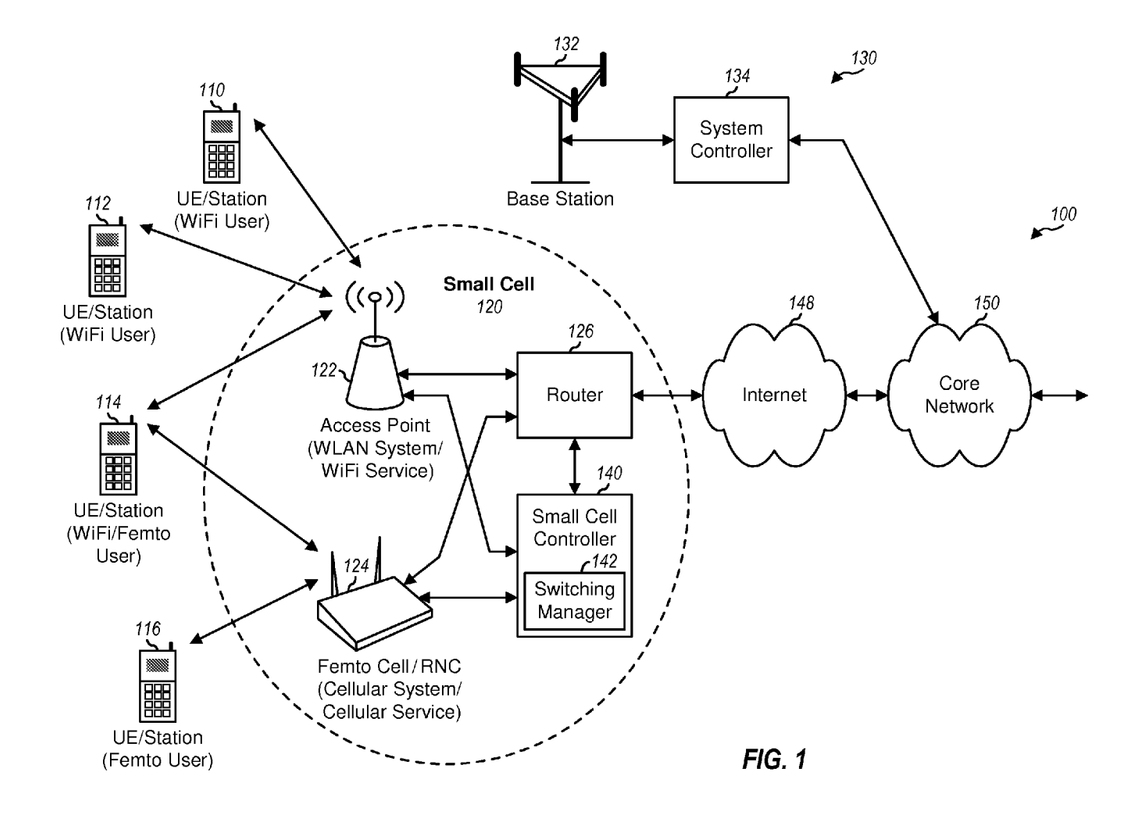
FIG. 1 shows an exemplary system deployment.

FIG. 1 shows an exemplary system deployment 100 in which various aspects of the present disclosure may be implemented. A small cell 120 may support communication for a small geographic area such as a home, an apartment, an office, a shop, etc. Small cell 120 may include an access point (AP) 122 supporting communication via a first radio technology and a femto cell 124 supporting communication via a second radio technology. Access point 122 may be part of a WLAN system providing WiFi service, and femto cell 124 may be part of a cellular system providing cellular service. A WLAN system is a wireless system supporting communication for a small geographic area, e.g., a home, an office, etc. A cellular system is a wireless system supporting communication for a large geographic area, e.g., a city, a state, a country, etc. Small cell 120 may thus support communication for multiple coexistence wireless systems, which are wireless systems with overlapping coverage and under the control of a common network entity. A network entity may be any entity that is not a UE and may also be referred to as a wireless node, etc.

Access point 122 may support a radio technology such as WiFi, Hiperlan, or some other WLAN radio technology. Access point 122 may support communication for a basic service set (BSS), which includes a set of stations that can communicate with each other. The BSS may also be referred to as a WLAN system.

Femto cell 124 may support a fourth generation (4G) radio technology such as LTE, a third generation (3G) radio technology such as WCDMA or CDMA 1x, a second generation (2G) radio technology such as GSM, or some other radio technology. Femto cell 124 may also be referred to as a home base station (HBS), a home access point (HAP), a home Node B (HNB), a home evolved Node B (HeNB), etc. Femto cell 124 may be configured to provide restricted access for a group of UEs, which may belong in a closed subscriber group (CSG). Femto cell 124 may allow a network operator to extend the coverage of a cellular system, to increase capacity, and/or to obtain other advantages. Femto cell 124 may communicate with other network entities in the cellular system. Femto cell 124 may operate as described in 3GPP TR 25.820, entitled "3G Home NodeB Study Item Technical Report," which is publicly available. Femto cell 124 may also operate as described in documents for other radio technologies. Femto cell 124 may include a radio network controller (RNC), which may perform some functions normally performed by an RNC in a cellular system.

Access point 122 and femto cell 124 may be coupled to a router 126, which may be coupled to the Internet 148 or some other data network. Router 126 may route traffic data between access point 122 and femto cell 124 and other entities. Access point 122 and femto cell 124 may further be coupled to a small cell controller 140, which may perform coordination and control functions for these entities. Small cell controller 140 may include various modules to perform coordination and control functions, such as a switching manager 142 that may support inter-system call switching of UEs between the WLAN system and the cellular system in small cell 120. Switching manager 142 may control (i) switching of UEs between the WLAN system and the cellular system in small cell 120 and (ii) switching of UEs from the WLAN system or the cellular system to a wireless system external to small cell 120. Small cell controller 140 may communicate with entities in a core network 150, which may include various network entities supporting communication and other services for UEs.

In an exemplary design, small cell 120 may be a physical hardware module or unit (e.g., a commercially available product), which may be purchased by a user and installed in a home, an apartment, etc. The hardware module for small cell 120 may include a first module (e.g., an integrated circuit (IC) chip or a circuit board) for access point 122, a second module for femto cell 124, a third module for router 126, and a fourth module for small cell controller 140. The fourth module for small cell controller 140 may include a memory storing various software modules, one of which may be switching manager 142. In general, small cell 120 may include any number of hardware modules. Each hardware module may perform any set of functions and may support access point 122, or femto cell 124, or router 126, or small cell controller 140, or a combination thereof. The functions of each of access point 122, femto cell 124, router 126, and small cell controller 140 may be implemented in software and/or hardware on one or more hardware modules.

A base station 132 may support communication for a relatively large geographic area, e.g., up to 10 kilometer (Km) in radius. A coverage area of base station 132 and/or a base station subsystem serving this coverage area may be referred to as a macro cell. Base station 132 may be part of a cellular system 130, which may include other base stations not shown in FIG. 1 for simplicity. Cellular system 130 may support the same radio technology as femto cell 124 or a different radio technology. Base station 132 may couple to a system controller 134, which may provide coordination and control for base station 132 and other base stations. System controller 134 may further couple to core network 150.

UEs 110 to 116 may be dispersed throughout the coverage area of small cell 120, and each UE may be stationary or mobile. A UE may also be referred to as a mobile station, a terminal, an access terminal, a subscriber unit, a station (STA), etc. A UE may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc. A UE may be able to communicate with access point 122 and/or femto cell 124 in small cell 120. A UE may also be able to communicate with base station 132 in cellular system 130. A UE may be referred to as a station (e.g., when communicating with access point 122), a user, etc.

As shown in FIG. 1, small cell 120 may include co-located access point 122 providing WLAN service and femto cell 124 providing cellular service. Any number of UEs (i.e., stations or users) may be located within the coverage of small cell 120. Each UE may support only WLAN service, or only cellular service, or both WLAN and cellular services. Any number of UEs in small cell 120 may be active at any given moment. The active UEs may have different capabilities and/or data requirements. The active UEs may also observe different channel conditions for access point 122 and femto cell 124.

In an aspect of the present disclosure, techniques for switching a UE between a serving system and a target system by first establishing a connection with the target system before disconnecting from the serving system are disclosed. These techniques may be referred to as inter-system call switching techniques. The target system and the serving system may support different radio technologies, and connection establishment and disconnection may typically be performed independently for each wireless system. The inter-system call switching techniques can coordinate the wireless systems in order to ensure that a new call for the UE is first established on the target system before breaking an existing call for the UE on the serving system, which may reduce switching interruption.

As shown in FIG. 1, UE 114 may be located within the coverage of access point 122 for the WLAN system and femto cell 124 for the cellular system. UE 114 may be switched between the WLAN system and the cellular system for various reasons such as heavy loading in the serving system and light loading in the target system, poor channel conditions for the serving system and better channel conditions for the target system, etc.

In a system deployment supporting multiple wireless systems (e.g., a WLAN system and a cellular system), an existing call on a current system may be switched to a new system by first breaking an existing call on the current system and then establishing a new call on the new system. However, communication would be interrupted during the time interval between breaking the existing call and establishing the new call. The inter-system call switching techniques disclosed herein attempt to reduce the interruption by first establishing the new call with the new system and then breaking the existing call with the current system.

Figure 2:
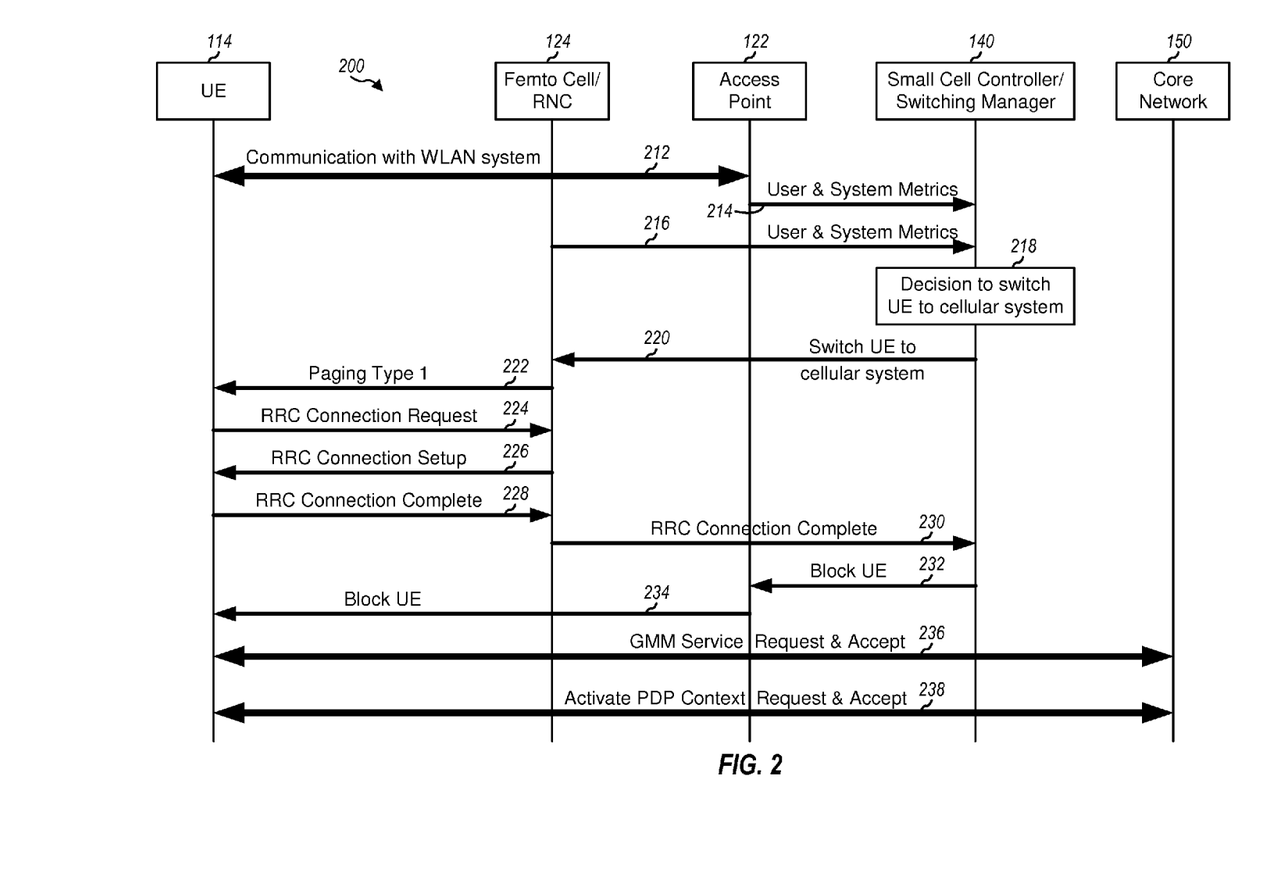
FIG. 2 shows a process for switching a UE between wireless systems.

FIG. 2 shows an exemplary call flow 200 for inter-system call switching from a WLAN system to a cellular system. Station/UE 114 may have an existing call with the WLAN system and may initially communicate with access point 122 in the WLAN system (step 212). Access point 122 may send its user metrics and/or system metrics to switching manager 142 within small cell controller 140 (step 214). Femto cell 124 (e.g., via its RNC) in the cellular system may also send its user metrics and/or system metrics to switching manager 142 (step 216). Steps 214 and 216 may be performed periodically (e.g., based on a predetermined schedule) and/or whenever triggered by certain events (e.g., whenever the user metrics and/or system metrics change by more than predetermined thresholds).

Switching manager 142 may receive the user metrics and/or system metrics from access point 122 and femto cell 124 and may decide to switch UE 114 from the WLAN system to the cellular system (step 218). The decision to switch UE 114 may be based on various criteria. In one design, UE 114 may be switched based on user metrics obtained for UE 114 by access point 122 and femto cell 124. For example, the user metrics may indicate that UE 114 has better channel quality for femto cell 124 than access point 122. In another design, UE 114 may be switched based on system metrics for access point 122 and femto cell 124. For example, the system metrics may indicate that access point 122 is heavily loaded whereas femto cell 124 is lightly loaded. The decision may also be made based on a combination of user metrics and system metrics. For example, UE 114 may be switched to the cellular system if an achievable data rate for UE 114 for the cellular system is higher than an achievable data rate for UE 114 for the WLAN system. The achievable data rate for each system may be dependent on the channel quality, the system load, etc.

After making a decision to switch UE 114 from the WLAN system to the cellular system, switching manager 142 may inform femto cell/RNC 124 of the switch (step 220). RNC 124 may (via the femto cell) page UE 114 based on a UE identity (ID) of UE 114 for the cellular system, which may be referred to as a cellular UE ID (step 222). The UE ID may be stored in a Subscriber Identity Module (SIM) or a UMTS SIM (USIM), which may be inserted in UE 114. In one design, the cellular UE ID of UE 114 may be identified/obtained via an authentication procedure for the WLAN system. This authentication procedure may be performed between UE 114 and the WLAN system prior to communication with the WLAN system in step 212. During this authentication procedure, cellular-capable UE 114 may send its cellular credentials (e.g., 3G credentials) for authentication to the WLAN system. The cellular UE ID of UE 114 may be determined from its cellular credentials. A mapping from the credentials used to authenticate UE 114 in the WLAN system to a Unique Mobile Subscriber Identity to a Temporary Radio Identifier may be performed by an access network or core network 150. The UE ID may refer to any of the identity or identifier described above.

RNC 124 may receive the switch decision from switching manager 142 in step 220 and, in response, may page UE 114 to establish a Radio Resource Control (RRC) connection with the cellular system (step 222). The page may include a paging reason of changing UE parameters, which may trigger UE 114 to send a pilot measurement report and/or other information. RNC 124 may also send fake traffic to UE 114 in order to bring up Packet Data Protocol (PDP) context establishment. PDP context refers to a logical association between a UE and a packet data network (PDN).

UE 114 may receive the page from RNC 124 in step 222 and may perform RRC connection setup to establish an RRC connection with RNC 124. In contrast to a break-then-establish method, UE 114 would continue the existing call on the WLAN system during the RRC connection setup with the cellular system. For the RRC connection setup, UE 114 may send an RRC connection request to RNC 124 (step 224). RNC 124 may receive the RRC connection request and may respond with an RRC connection setup message, which may include pertinent parameters for the new RRC connection between UE 114 and RNC 124 (step 226). UE 114 may then send an RRC connection complete message to RNC 124 (step 228). UE 114 may continue to communicate with the WLAN system during connection setup with the cellular system.

After receiving the RRC connection complete message from UE 114, RNC 124 may inform switching manager 142 that UE 114 has established an RRC connection with the cellular system (step 230). Switching manager 142 may then request access point 122 to block UE 114 from accessing the WLAN system (step 232). Access point 122 may receive the request from switching manager 142 and may block UE 114 from accessing the WLAN system (step 234). Access point 122 may block UE 114 by (i) not sending a probe response to acknowledge a probe request sent by UE 114, (ii) not sending an association response to acknowledge an association request sent by UE 114, (iii) indicating high loading in a probe response or an association response, (iv) not completing authentication for UE 114, or (v) performing other actions. As shown in FIG. 2, call connection may first be established for a new call on the cellular system prior to terminating an existing call on the WLAN system.

UE 114 may communicate with femto cell/RNC 124 after being blocked on the WLAN system. For example, UE 114 may send a GPRS Mobility Management (GMM) service request to core network 150 and may receive an accept response from core network 150 (step 236). UE 114 may also send an activate PDP context request to core network 150 and may receive an accept response from core network 150.

As shown in FIG. 2, a decision to switch UE 114 from the WLAN system to the cellular system may be based on information from the WLAN system and/or information from the cellular system. Furthermore, the overall process may be controlled by switching manager 142, which may communicate with both the WLAN system and the cellular system to facility call switching between wireless systems for UE 114.

Figure 3:
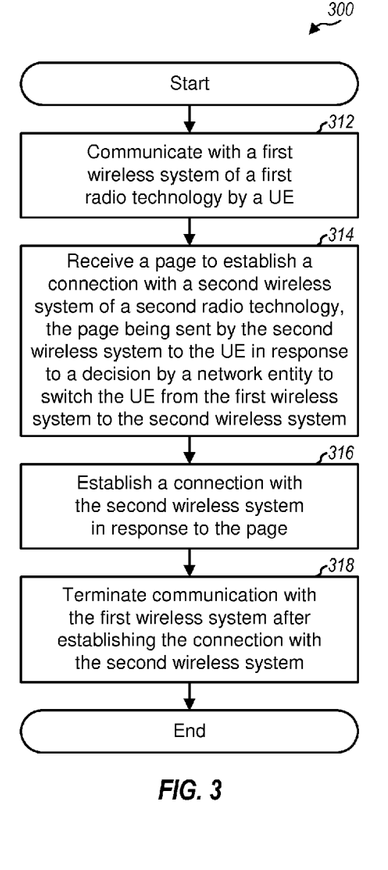
FIG. 3 shows a process performed by a UE to switch between wireless systems.

FIG. 3 shows a design of a process 300 for switching wireless systems. Process 300 may be performed by a UE (as described below) or by some other entity. The UE may communicate with a first wireless system (e.g., a WLAN system) of a first radio technology (block 312). The UE may receive a page to establish a connection with a second wireless system (e.g., a cellular system) of a second radio technology (block 314). In one design, the first and second wireless systems may be part of a small cell, which may be designed to perform at least one control function for the first and second wireless systems. In other designs, the first and second wireless systems may be other wireless systems. The page may be sent by the second wireless system to the UE in response to a decision by a network entity (e.g., the small cell) to switch the UE from the first wireless system to the second wireless system. The UE may establish a connection with the second wireless system in response to the page (block 316). The UE may continue to communicate with the first wireless system while establishing the connection with the second wireless system. The UE may terminate communication with the first wireless system after establishing the connection with the second wireless system (block 318).

In one design, the UE may perform an authentication procedure with the first wireless system prior to communicating with the first wireless system. The UE may provide its credentials for the second wireless system during the authentication procedure. The credentials may comprise a UE ID of the UE. The page may be sent to the UE based on the UE ID of the UE.

In one design of block 318, the UE may determine that it is blocked from accessing the first wireless system after establishing the connection with the second wireless system. The UE may terminate communication with the first wireless system in response to the determination that it is blocked.

Figure 4:
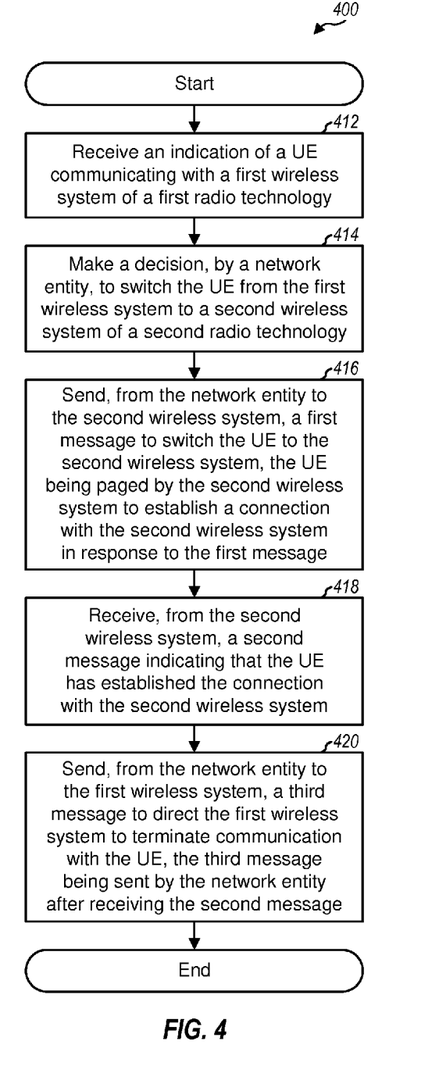
FIG. 4 shows a process performed by a small cell to switch a UE between wireless systems.

FIG. 4 shows a design of a process 400 for switching a UE between wireless systems. Process 400 may be performed by a network entity (as described below) or by some other entity. The network entity may be a small cell (e.g., a small cell controller or some other entity). The network entity may receive an indication of a UE communicating with a first wireless system (e.g., a WLAN system) of a first radio technology (block 412). The network entity may make a decision to switch the UE from the first wireless system to a second wireless system (e.g., a cellular system) of a second radio technology (block 414). In one design, the first and second wireless systems may be part of a small cell, which may be controlled by the network entity for at least one function. The network entity may send, to the second wireless system, a first message to switch the UE to the second wireless system (block 416). In response to the first message, the UE may be paged by the second wireless system to establish a connection with the second wireless system. The network entity may receive, from the second wireless system, a second message indicating that the UE has established the connection with the second wireless system (block 418). The network entity may then send, to the first wireless system, a third message to direct the first wireless system to terminate communication with the UE (block 420). The network entity may send the third message after receiving the second message.

In one design, the network entity may receive at least one first user metric for the UE from the first wireless system and/or at least one second user metric for the UE from the second wireless system. The at least one first user metric may comprise channel quality achieved by the UE for the first wireless system and/or other metrics. The at least one second user metric may comprise channel quality achieved by the UE for the second wireless system and/or other metrics. The network entity may make the decision to switch the UE from the first wireless system to the second wireless system based on the at least one first user metric and/or the at least one second user metric.

In another design, the network entity may receive at least one first system metric from the first wireless system and/or at least one second system metric from the second wireless system. The at least one first system metric may comprise loading at the first wireless system and/or other metrics. The at least one second system metric may comprise loading at the second wireless system and/or other metrics. The network entity may make the decision to switch the UE from the first wireless system to the second wireless system based on the at least one first system metric and/or the at least one second system metric. The network entity may also make the decision based on a combination of user metrics and system metrics.

Figure 5:
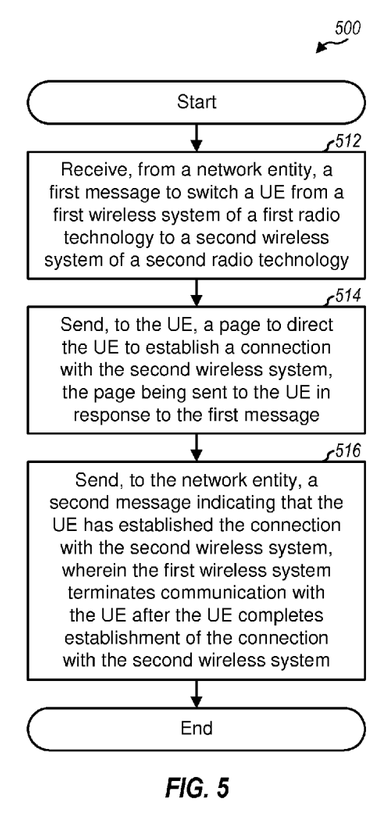
FIG. 5 shows a process performed by a network entity (e.g., a femto cell) to switch a UE between wireless systems.

FIG. 5 shows a design of a process 500 for supporting switching of a UE between wireless systems. Process 500 may be performed by a femto cell (as described below) or by some other entity. The femto cell may receive, from a network entity, a first message to switch a UE from a first wireless system (e.g., a WLAN system) of a first radio technology to a second wireless system (e.g., a cellular system) of a second radio technology (block 512). The femto cell may send, to the UE, a page to trigger the UE to establish a connection with the second wireless system (block 514). The femto cell may send the page to the UE in response to the first message. The femto cell may send, to the network entity, a second message indicating that the UE has established the connection with the second wireless system (block 516). The first wireless system may terminate communication with the UE after the UE completed establishment of the connection with the second wireless system.

In one design, the femto cell may send at least one user metric for the UE to the network entity. In another design, the femto cell may send at least one system metric for the second wireless system to the network entity. The network entity may make a decision to switch the UE from the first wireless system to the second wireless system based on the at least one user metric for the UE and/or the at least one system metric for the second wireless system.

In one design, the femto cell may obtain a UE ID of the UE based on credentials of the UE for the second wireless system. The credentials may be provided by the UE during an authentication procedure performed by the UE with the first wireless system. The femto cell may send the page to the UE based on the UE ID of the UE.

Figure 6:
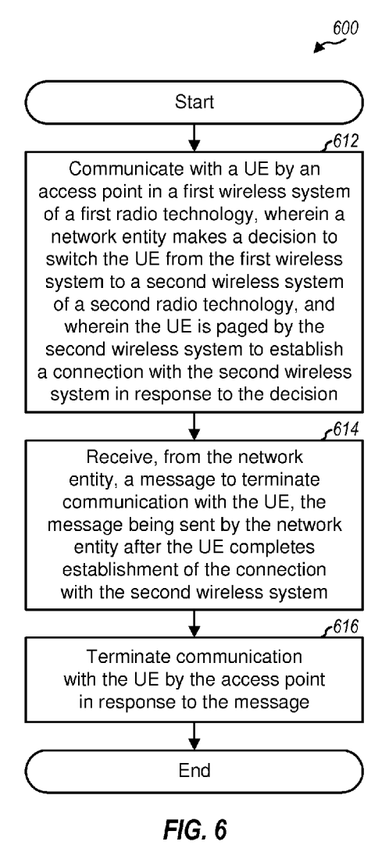
FIG. 6 shows a process performed by another network entity (e.g., an access point) to switch a UE between wireless systems.

FIG. 6 shows a design of a process 600 for supporting switching of a UE between wireless systems. Process 600 may be performed by an access point (as described below) or by some other entity. The access point may belong in a first wireless system (e.g., a WLAN system) of a first radio technology and may communicate with a UE (block 612). A network entity (e.g., a small cell) may make a decision to switch the UE from the first wireless system to a second wireless system (e.g., a cellular system) of a second radio technology. The UE may be paged by the second wireless system to establish a connection with the second wireless system in response to the decision. The access point may receive, from the network entity, a message to terminate communication with the UE (block 614). The message may be sent by the network entity after the UE completed establishment of the connection with the second wireless system. The access point may terminate communication with the UE in response to the message (block 616).

In one design, the access point may send at least one user metric for the UE to the network entity. In another design, the access point may send at least one system metric for the first wireless system to the network entity. The network entity may make the decision to switch the UE from the first wireless system to the second wireless system based on the at least one user metric for the UE and/or the at least one system metric for the first wireless system.

In one design, the access point may receive credentials of the UE for the second wireless system during an authentication procedure performed by the UE with the first wireless system. The access point may obtain a UE ID of the UE based on the credentials of the UE for the second wireless system. The access point may provide the UE ID of the UE to the second wireless system. The UE may be paged by the second wireless system based on the UE ID of the UE.

In one design of block 616, the access point may block the UE from accessing the first wireless system in order to terminate communication with the UE. The access point may block the UE from accessing the first wireless system by not sending a probe response to acknowledge a probe request sent by the UE, or not sending an association response to acknowledge an association request sent by the UE, or indicating high loading at the first wireless system in a response sent to the UE, or not completing authentication for the UE, or a combination thereof.

Figure 7:
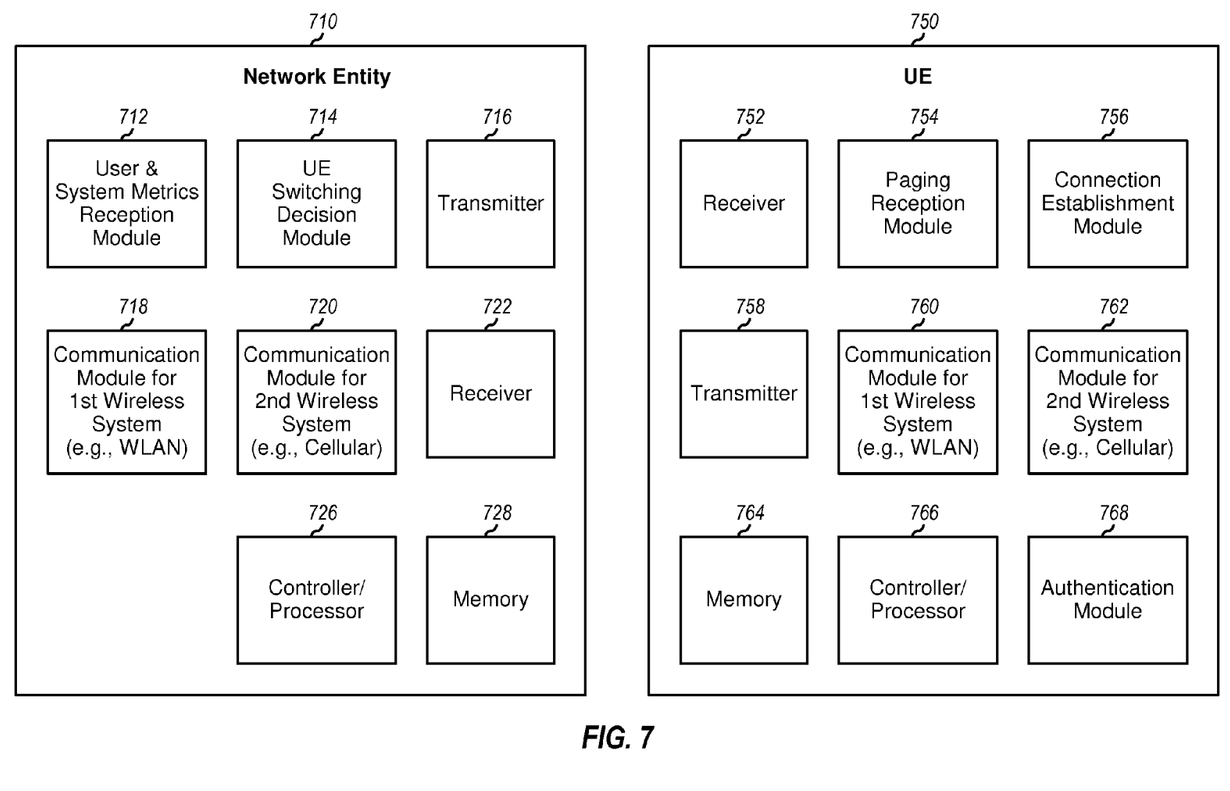
FIG. 7 shows a block diagram of a network entity and a UE.

FIG. 7 shows a block diagram of a design of a network entity 710 and a UE 750. Network entity 710 may be responsible for switching UEs between wireless systems (e.g., in a small cell) and may correspond to switching manager 142 or small cell controller 140 in FIG. 1 or some other network entity. Network entity 710 may directly communicate with UE 750 or may communicate with UE 750 via one or more other entities. UE 750 may correspond to any of UEs 110 to 116 in FIG. 1.

At network entity 710, a module 712 may receive (i) user metrics for UEs communicating with a plurality of wireless systems (e.g., a WLAN system and a cellular system in a small cell) and/or (ii) system metrics for the plurality of wireless systems. A module 714 may make decisions to switch UEs between wireless systems, e.g., based on the user metrics and/or the system metrics. A module 718 may support communication with a first wireless system of a first radio technology, e.g., the WLAN system. Module 718 may send messages to direct the first wireless system to block UEs that have been switched from the first wireless system to other wireless systems. A module 820 may support communication with a second wireless system of a second radio technology, e.g., the cellular system. Module 720 may send messages to the second wireless system to trigger the second wireless system to page UEs that have been switched from other wireless systems to the second wireless system. Module 720 may also receive messages indicating that UEs have completed connection establishment for the second wireless system. Module 718 may send messages to the first wireless system to block UEs in response to messages received from the second wireless system. A transmitter 716 may generate and send signals comprising switching decisions for UEs, messages for the first wireless system, messages for the second wireless system, etc. A receiver 722 may receive and process signals sent by UEs and/or other network entities. The various modules within network entity 710 may operate as described above. A controller/processor 726 may direct the operation of various modules within network entity 710. A memory 728 may store data and program codes for network entity 710.

At UE 750, a module 754 may receive pages sent to UE 750, e.g., to direct UE 750 to establish a connection with the second wireless system to which UE 750 has been switched. A module 756 may establish a connection with the second wireless system, e.g., when triggered by a page. A module 760 may support communication with the first wireless system of the first radio technology, e.g., the WLAN system. A module 762 may support communication with the second wireless system of the second radio technology, e.g., the cellular system. A module 768 may perform authentication of UE 750 with the first wireless system and may provide credentials of UE 750 for the second wireless system. The credentials may include a UE ID of UE 750, which may be used by the second wireless system to page UE 750. A receiver 752 may receive and process signals sent by base stations and/or other network entities. A transmitter 758 may generate and send signals comprising information to send by UE 750. The various modules within UE 750 may operate as described above. A controller/processor 766 may direct the operation of various modules within base station 110x. A memory 764 may store data and program codes for UE 750.

Figure 8:
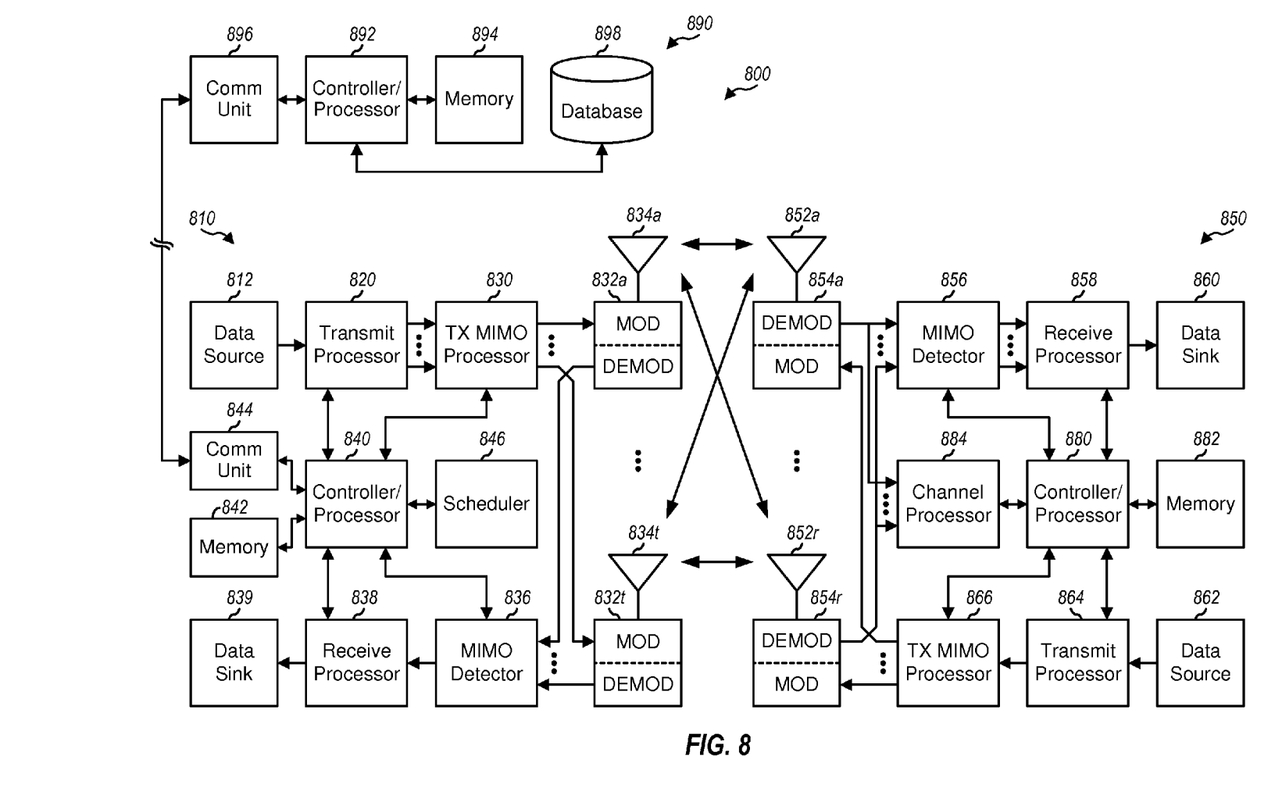
FIG. 8 shows a block diagram of a small cell and a UE.

FIG. 8 shows a block diagram of a small cell 800 and a UE 850. UE 850 may correspond to any of UEs 110 to 116 in FIG. 1. Small cell 800 may be one design of small cell 120 in FIG. 1 and may include a base station 810 and a small cell controller 890. Small cell controller 890 may correspond to small cell controller 140 in FIG. 1. Base station 810 may correspond to access point 122 or femto cell 124 in FIG. 1. Base station 810 may be equipped with T antennas 834a through 834t, and UE 850 may be equipped with R antennas 852a through 852r, where in general T≥1 and R≥1.

At base station 810, a transmit processor 820 may receive data from a data source 812 and control information (e.g., messages for switching between wireless systems) from a controller/processor 840. Processor 820 may process (e.g., encode and modulate) the data and control information to obtain data symbols and control symbols, respectively. Processor 820 may also generate reference symbols for synchronization signals, reference signals, etc. A transmit (TX) multiple-input multiple-output (MIMO) processor 830 may perform spatial processing (e.g., precoding) on the data symbols, the control symbols, and/or the reference symbols, if applicable, and may provide T output symbol streams to T modulators (MODs) 832a through 832t. Each modulator 832 may process a respective output symbol stream (e.g., for OFDM, SC-FDMA, CDMA, etc.) to obtain an output sample stream. Each modulator 832 may further process (e.g., convert to analog, amplify, filter, and upconvert) the output sample stream to obtain a downlink signal. T downlink signals from modulators 832a through 832t may be transmitted via T antennas 834a through 834t, respectively.

At UE 850, antennas 852a through 852r may receive the downlink signals from base station 810 and other base stations. Antennas 852a through 852r may provide received signals to demodulators (DEMODs) 854a through 854r, respectively. Each demodulator 854 may condition (e.g., filter, amplify, downconvert, and digitize) a respective received signal to obtain input samples. Each demodulator 854 may further process the input samples (e.g., for SC-FDMA, OFDMA, CDMA, etc.) to obtain received symbols. A MIMO detector 856 may obtain received symbols from all R demodulators 854a through 854r, perform MIMO detection on the received symbols if applicable, and provide detected symbols. A receive processor 858 may process (e.g., demodulate and decode) the detected symbols, provide decoded data for UE 850 to a data sink 860, and provide decoded control information to a controller/processor 880. A channel processor 884 at UE 850 may receive downlink signals from base station 810 and/or other base stations. Processor 880 may determine channel quality for base station 810 and/or other base stations based on the received downlink signals.

On the uplink, at UE 850, a transmit processor 864 may receive data from a data source 862 and control information (e.g., messages for switching UE 850 between wireless systems) from controller/processor 880. Processor 864 may process (e.g., encode and modulate) the data and control information to obtain data symbols and control symbols, respectively. Processor 864 may also generate reference symbols for reference signals. The symbols from transmit processor 864 may be precoded by a TX MIMO processor 866 if applicable, further processed by modulators 854a through 854r (e.g., for OFDMA, SC-FDMA, CDMA, etc.), and transmitted to base station 810 and other base stations. At base station 810, the uplink signals from UE 850 and other UEs may be received by antennas 834, processed by demodulators 832, detected by a MIMO detector 836 if applicable, and further processed by a receive processor 838 to obtain decoded data and control information sent by UE 850 and other UEs. Processor 838 may provide the decoded data to a data sink 839 and the decoded control information to controller/processor 840.

Controllers/processors 840 and 880 may direct the operation at base station 810 and UE 850, respectively. Processor 880 and/or other processors and modules at UE 850 may perform or direct process 300 in FIG. 3, the portion of process 200 in FIG. 2 for UE 114, and/or other processes for the techniques described herein. Processor 840 and/or other processors and modules at base station 810 may perform or direct process 500 in FIG. 5, process 600 in FIG. 6, the portion of process 200 in FIG. 2 for access point 122 or femto cell 124, and/or other processes for the techniques described herein. Memories 842 and 882 may store data and program codes for base station 810 and UE 850, respectively. A communication (Comm) unit 844 may enable base station 810 to communicate with other network entities. A scheduler 846 may schedule UEs for communication and may assign resources to the scheduled UEs.

Within small cell controller 890, a controller/processor 892 may perform various functions to support communication for UEs. Processor 892 and/or other processors and modules at small cell controller 890 may perform or direct process 400 in FIG. 4, the portion of process 200 in FIG. 2 for small cell controller 140, and/or other processes for the techniques described herein. A memory 894 may store program codes and data for small cell controller 890. A storage unit 894 may store information for UEs and/or wireless systems within the control of small cell controller 890. A communication unit 896 may enable small cell controller 890 to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   communicating with a first wireless system of a first radio technology by a user equipment (UE);
   receiving a page to establish a connection with a second wireless system of a second radio technology, the page being sent by the second wireless system to the UE in response to a decision by a network entity to switch the UE from the first wireless system to the second wireless system, wherein the decision is based on a load on the first wireless system relative to a load on the second wireless system, or a channel quality for the first wireless system relative to a channel quality for the second wireless system, or a data rate for the UE for the first wireless system relative to a data rate for the UE for the second wireless system, or any combination thereof, wherein the first and second wireless systems are part of a small cell that supports communication for a small geographic area in which the network entity is located to switch the UE from the first wireless system to the second wireless system;
   establishing the connection with the second wireless system in response to the page; and
   terminating communication with the first wireless system, wherein the terminating communication with the first wireless system comprises:
   determining the UE is being blocked from accessing the first wireless system by not receiving a probe response to acknowledge a probe request sent by the UE, or not receiving an association response to acknowledge an association request sent by the UE, or receiving an indication of high loading at the first wireless system in a response sent to the UE, or authentication for the UE with the first wireless system being incomplete, or a combination thereof after establishing the connection with the second wireless system, and
   terminating communication with the first wireless system in response to the determining the UE is being blocked.

2. The method of claim 1, further comprising:
   continuing to communicate with the first wireless system while establishing the connection with the second wireless system.

3. The method of claim 1, further comprising:
   performing an authentication procedure with the first wireless system; and
   providing credentials of the UE for the second wireless system during the authentication procedure with the first wireless system, the credentials comprising a UE identity (ID) of the UE, and the page being sent to the UE based on the UE ID of the UE.

4. The method of claim 1, further comprising:
   altering communication with the first wireless system after establishing the connection with the second wireless system.

5. The method of claim 1, wherein the decision to switch the UE is based on at least one first user metric obtained by the first wireless system for the UE, or at least one second user metric obtained by the second wireless system for the UE, or both.

6. The method of claim 1, wherein the decision to switch the UE is based on at least one first system metric obtained by the first wireless system for the first wireless system, or at least one second system metric obtained by the second wireless system for the second wireless system, or both.

7. The method of claim 1, wherein the first wireless system comprises a wireless local area network (WLAN) system and the second wireless system comprises a cellular system.

8. The method of claim 1, wherein the small cell is designated to perform at least one control function for the first and second wireless systems.

9. An apparatus for wireless communication, comprising:
   at least one processor configured to:
   communicate with a first wireless system of a first radio technology by a user equipment (UE);
   receive a page to establish a connection with a second wireless system of a second radio technology, the page being sent by the second wireless system to the UE in response to a decision by a network entity, wherein the decision is based on a load on the first wireless system relative to a load on the second wireless system, or a channel quality for the first wireless system relative to a channel quality for the second wireless system, or a data rate for the UE for the first wireless system relative to a data rate for the UE for the second wireless system, or any combination thereof, wherein the first and second wireless systems are part of a small cell that supports communication for a small geographic area in which the network entity is located to switch the UE from the first wireless system to the second wireless system;
   establish the connection with the second wireless system in response to the page; and
   terminate communication with the first wireless system after establishing the connection with the second wireless system, wherein the configuration of the at least one processor to terminate communication with the first wireless system comprises:
   configuration to determine the UE is being blocked from accessing the first wireless system by not receiving a probe response to acknowledge a probe request sent by the UE, or not receiving an association response to acknowledge an association request sent by the UE, or receiving an indication of high loading at the first wireless system in a response sent to the UE, or authentication for the UE with the first wireless system being incomplete, or a combination thereof after establishing the connection with the second wireless system, and
   configuration to terminate communication with the first wireless system in response to determining the UE is being blocked.

10. The apparatus of claim 9, wherein the at least one processor is configured to continue to communicate with the first wireless system while establishing the connection with the second wireless system.

11. An apparatus for wireless communication, comprising:
means for communicating with a first wireless system of a first radio technology by a user equipment (UE);
means for receiving a page to establish a connection with a second wireless system of a second radio technology, the page being sent by the second wireless system to the UE in response to a decision by a network entity, wherein the decision is based on a load on the first wireless system relative to a load on the second wireless system, or a channel quality for the first wireless system relative to a channel quality for the second wireless system, or a data rate for the UE for the first wireless system relative to a data rate for the UE for the second wireless system, or any combination thereof, wherein the first and second wireless systems are part of a small cell that supports communication for a small geographic area in which the network entity is located to switch the UE from the first wireless system to the second wireless system;
means for establishing the connection with the second wireless system in response to the page; and
means for terminating communication with the first wireless system after establishing the connection with the second wireless system, wherein the means for terminating communication with the first wireless system comprises:
  means for determining the UE is being blocked from accessing the first wireless system by not receiving a probe response to acknowledge a probe request sent by the UE, or not receiving an association response to acknowledge an association request sent by the UE, or receiving an indication of high loading at the first wireless system in a response sent to the UE, or authentication for the UE with the first wireless system being incomplete, or a combination thereof after establishing the connection with the second wireless system, and
  means for terminating communication with the first wireless system in response to determining the UE is being blocked.

12. The apparatus of claim 11, further comprising:
means for continuing to communicate with the first wireless system while establishing the connection with the second wireless system.

13. A non-transitory computer-readable medium, comprising:
code for causing at least one processor to communicate with a first wireless system of a first radio technology by a user equipment (UE);
code for causing the at least one processor to receive a page to establish a connection with a second wireless system of a second radio technology, the page being sent by the second wireless system to the UE in response to a decision by a network entity, wherein the decision is based on a load on the first wireless system relative to a load on the second wireless system, or a channel quality for the first wireless system relative to a channel quality for the second wireless system, or a data rate for the UE for the first wireless system relative to a data rate for the UE for the second wireless system, or any combination thereof, wherein the first and second wireless systems are part of a small cell that supports communication for a small geographic area in which the network entity is located to switch the UE from the first wireless system to the second wireless system;
code for causing the at least one processor to establish the connection with the second wireless system in response to the page; and
code for causing the at least one processor to terminate communication with the first wireless system after establishing the connection with the second wireless system, wherein the code for causing the at least one processor to terminate communication with the first wireless system comprises:
  code for causing the at least one processor to determine the UE is being blocked from accessing the first wireless system by not receiving a probe response to acknowledge a probe request sent by the UE, or not receiving an association response to acknowledge an association request sent by the UE, or receiving an indication of high loading at the first wireless system in a response sent to the UE, or authentication for the UE with the first wireless system being incomplete, or a combination thereof after establishing the connection with the second wireless system, and
  code for causing the at least one processor to terminate communication with the first wireless system in response to determining the UE is being blocked.

14. A method for wireless communication, comprising:
receiving an indication of a user equipment (UE) communicating with a first wireless system of a first radio technology;
making a decision, by a network entity, to switch the UE from the first wireless system to a second wireless system of a second radio technology, wherein the first and second wireless systems are part of a small cell that supports communication for a small geographic area in which the network entity is located;
sending, from the network entity to the second wireless system, a first message to switch the UE to the second wireless system, the UE being paged by the second wireless system to establish a connection with the second wireless system in response to the first message;
receiving, from the second wireless system, a second message indicating that the UE has established the connection with the second wireless system; and
sending, from the network entity to the first wireless system, a third message to direct the first wireless system to terminate communication with the UE by blocking the UE from accessing the first wireless system by not sending a probe response to acknowledge a probe request sent by the UE, or not sending an association response to acknowledge an association request sent by the UE, or indicating high loading at the first wireless system in a response sent to the UE, or not completing authentication for the UE, or a combination thereof, the third message being sent by the network entity after receiving the second message.

15. The method of claim 14, further comprising:
receiving at least one first user metric for the UE from the first wireless system, or at least one second user metric for the UE from the second wireless system, or both; and
making the decision to switch the UE from the first wireless system to the second wireless system based on the at least one first user metric, or the at least one second user metric, or both.

16. The method of claim 15, wherein the at least one first user metric comprises channel quality achieved by the UE for the first wireless system, and wherein the at least one second user metric comprises channel quality achieved by the UE for the second wireless system.

17. The method of claim 14, further comprising:
receiving at least one first system metric from the first wireless system, or at least one second system metric from the second wireless system, or both; and making the decision to switch the UE from the first wireless system to the second wireless system based on the at least one first system metric, or the at least one second system metric, or both.

18. The method of claim 17, wherein the at least one first system metric comprises loading at the first wireless system, and wherein the at least one second system metric comprises loading at the second wireless system.

19. An apparatus for wireless communication, comprising:
at least one processor configured to:
receive an indication of a user equipment (UE) communicating with a first wireless system of a first radio technology;
make a decision, by a network entity, to switch the UE from the first wireless system to a second wireless system of a second radio technology, wherein the first and second wireless systems are part of a small cell that supports communication for a small geographic area in which the network entity is located;
send, from the network entity to the second wireless system, a first message to switch the UE to the second wireless system, the UE being paged by the second wireless system to establish a connection with the second wireless system in response to the first message;
receive, from the second wireless system, a second message indicating that the UE has established the connection with the second wireless system; and
send, from the network entity to the first wireless system, a third message to direct the first wireless system to terminate communication with the UE by blocking the UE from accessing the first wireless system by not sending a probe response to acknowledge a probe request sent by the UE, or not sending an association response to acknowledge an association request sent by the UE, or indicating high loading at the first wireless system in a response sent to the UE, or not completing authentication for the UE, or a combination thereof, the third message being sent by the network entity after receiving the second message.

20. The apparatus of claim 19, wherein the at least one processor is configured to:
receive at least one first user metric for the UE from the first wireless system, or at least one second user metric for the UE from the second wireless system, or both; and
make the decision to switch the UE from the first wireless system to the second wireless system based on the at least one first user metric, or the at least one second user metric, or both.

21. The apparatus of claim 19, wherein the at least one processor is configured to:
receive at least one first system metric from the first wireless system, or at least one second system metric from the second wireless system, or both; and
make the decision to switch the UE from the first wireless system to the second wireless system based on the at least one first system metric, or the at least one second system metric, or both.

22. An apparatus for wireless communication, comprising:
means for receiving an indication of a user equipment (UE) communicating with a first wireless system of a first radio technology;
means for making a decision, by a network entity, to switch the UE from the first wireless system to a second wireless system of a second radio technology, wherein the first and second wireless systems are part of a small cell that supports communication for a small geographic area in which the network entity is located;
means for sending, from the network entity to the second wireless system, a first message to switch the UE to the second wireless system, the UE being paged by the second wireless system to establish a connection with the second wireless system in response to the first message;
means for receiving, from the second wireless system, a second message indicating that the UE has established the connection with the second wireless system; and
means for sending, from the network entity to the first wireless system, a third message to direct the first wireless system to terminate communication with the UE by blocking the UE from accessing the first wireless system by not sending a probe response to acknowledge a probe request sent by the UE, or not sending an association response to acknowledge an association request sent by the UE, or indicating high loading at the first wireless system in a response sent to the UE, or not completing authentication for the UE, or a combination thereof, the third message being sent by the network entity after receiving the second message.

23. The apparatus of claim 22, further comprising:
means for receiving at least one first user metric for the UE from the first wireless system, or at least one second user metric for the UE from the second wireless system, or both; and
means for making the decision to switch the UE from the first wireless system to the second wireless system based on the at least one first user metric, or the at least one second user metric, or both.

24. The apparatus of claim 22, further comprising:
means for receiving at least one first system metric from the first wireless system, or at least one second system metric from the second wireless system, or both; and
means for making the decision to switch the UE from the first wireless system to the second wireless system based on the at least one first system metric, or the at least one second system metric, or both.

25. A non-transitory computer-readable medium, comprising:
code for causing at least one processor to receive an indication of a user equipment (UE) communicating with a first wireless system of a first radio technology;
code for causing the at least one processor to make a decision, by a network entity, to switch the UE from the first wireless system to a second wireless system of a second radio technology, wherein the first and second wireless systems are part of a small cell that supports communication for a small geographic area in which the network entity is located;
code for causing the at least one processor to send, from the network entity to the second wireless system, a first message to switch the UE to the second wireless system, the UE being paged by the second wireless system to establish a connection with the second wireless system in response to the first message;
code for causing the at least one processor to receive, from the second wireless system, a second message indicating that the UE has established the connection with the second wireless system; and
code for causing the at least one processor to send, from the network entity to the first wireless system, a third message to direct the first wireless system to terminate communication with the UE by blocking the UE from accessing the first wireless system by not sending a probe response to acknowledge a probe request sent by the UE, or not sending an association response to acknowledge an association request sent by the UE, or indicating high loading at the first wireless system in a response sent to the UE, or not completing authentication for the UE, or a combination thereof, the third message being sent by the network entity after receiving the second message.

26. A method for wireless communication, comprising:

receiving, from a network entity, a first message to switch a user equipment (UE) from a first wireless system of a first radio technology to a second wireless system of a second radio technology, wherein a decision to switch is based on a load on the first wireless system relative to a load on the second wireless system, or a channel quality for the first wireless system relative to a channel quality for the second wireless system, or a data rate for the UE for the first wireless system relative to a data rate for the UE for the second wireless system, or any combination thereof, wherein the first and second wireless systems are part of a small cell that supports communication for a small geographic area in which the network entity is located to switch the UE from the first wireless system to the second wireless system;

sending, to the UE, a page to trigger the UE to establish a connection with the second wireless system, the page being sent to the UE in response to the first message; and sending, to the network entity, a second message indicating that the UE has established the connection with the second wireless system, wherein the first wireless system terminates communication with the UE by blocking the UE from accessing the first wireless system by not sending a probe response to acknowledge a probe request sent by the UE, or not sending an association response to acknowledge an association request sent by the UE, or indicating high loading at the first wireless system in a response sent to the UE, or not completing authentication for the UE, or a combination thereof after the UE completed establishment of the connection with the second wireless system.

27. The method of claim 26, further comprising:

sending at least one user metric for the UE to the network entity, wherein a decision to switch the UE from the first wireless system to the second wireless system is made by the network entity based on the at least one user metric for the UE.

28. The method of claim 26, further comprising:

sending at least one system metric for the second wireless system to the network entity, wherein a decision to switch the UE from the first wireless system to the second wireless system is made by the network entity based on the at least one system metric for the second wireless system.

29. The method of claim 26, further comprising:

obtaining a UE identity (ID) of the UE based on credentials of the UE for the second wireless system, the credentials being provided by the UE during an authentication procedure performed by the UE with the first wireless system; and sending the page to the UE based on the UE ID of the UE.

30. A method for wireless communication, comprising:

communicating with a user equipment (UE) by an access point in a first wireless system of a first radio technology, wherein a network entity makes a decision to switch the UE from the first wireless system to a second wireless system of a second radio technology, wherein the first and second wireless systems are part of a small cell that supports communication for a small geographic area in which the network entity is located, and wherein the UE is paged by the second wireless system to establish a connection with the second wireless system in response to the decision;

receiving, from the network entity, a message to terminate communication with the UE, the message being sent by the network entity after the UE completed establishment of the connection with the second wireless system; and terminating communication with the UE by the access point in response to the message, wherein the terminating communication with the UE comprises blocking the UE from accessing the first wireless system to terminate communication with the UE, wherein the blocking the UE comprises blocking the UE from accessing the first wireless system by not sending a probe response to acknowledge a probe request sent by the UE, or not sending an association response to acknowledge an association request sent by the UE, or indicating high loading at the first wireless system in a response sent to the UE, or not completing authentication for the UE, or a combination thereof.

31. The method of claim 30, further comprising:

sending at least one user metric for the UE to the network entity, wherein the decision to switch the UE from the first wireless system to the second wireless system is made by the network entity based on the at least one user metric for the UE.

32. The method of claim 30, further comprising:

sending at least one system metric for the first wireless system to the network entity, wherein the decision to switch the UE from the first wireless system to the second wireless system is made by the network entity based on the at least one system metric for the first wireless system.

33. The method of claim 30, further comprising:

receiving credentials of the UE for the second wireless system during an authentication procedure performed by the UE with the first wireless system;

obtaining a UE identity (ID) of the UE based on the credentials of the UE for the second wireless system; and providing the UE ID of the UE to the second wireless system, wherein the UE is paged by the second wireless system based on the UE ID of the UE.

* * * * *